United States Patent
Pears et al.

(10) Patent No.: US 6,395,827 B1
(45) Date of Patent: May 28, 2002

(54) AQUEOUS CROSSLINKABLE COATING COMPOSITIONS

(75) Inventors: David Alan Pears, Blackley (GB); Erik Hendrik Colstee, Utrecht; Gerardus Cornelis Overbeek, Waalwijk, both of (NL); John Christopher Padget, Frodsham (GB); Tijs Nabuurs, Waalwijk (NL)

(73) Assignee: Avecia Limited, Blakely (GB)

( * ) Notice: Subject to any disclaimer, the term of this patent is extended or adjusted under 35 U.S.C. 154(b) by 0 days.

(21) Appl. No.: 09/402,586

(22) PCT Filed: Mar. 30, 1998

(86) PCT No.: PCT/GB98/00948

§ 371 (c)(1),
(2), (4) Date: Nov. 22, 1999

(87) PCT Pub. No.: WO98/45347

PCT Pub. Date: Oct. 15, 1998

(30) Foreign Application Priority Data

Apr. 7, 1997 (GB) .............................. 9707036

(51) Int. Cl.$^7$ .............................. C08F 8/00; C08G 63/91
(52) U.S. Cl. ................... 525/55; 524/832; 524/833; 524/845; 524/555; 528/363; 525/450; 525/451; 525/452; 525/453; 523/335; 526/75; 526/78; 526/79; 526/318; 526/318.2; 526/318.3; 526/319; 526/321; 526/325
(58) Field of Search .................. 526/318.2, 318.3, 526/320; 523/335, 336; 525/329.9, 330.5, 374, 131, 123, 832, 845, 452, 453, 450, 451; 524/507, 460, 458; 528/363

(56) References Cited

U.S. PATENT DOCUMENTS

| | | | | |
|---|---|---|---|---|
| 2,141,546 A | * | 12/1938 | Strain .......................... 260/78 |
| 4,065,423 A | * | 12/1977 | Hen ...................... 260/29.7 H |
| 5,051,464 A | * | 9/1991 | Johnson et al. .............. 524/555 |
| 5,276,104 A | * | 1/1994 | Hoffmann et al. ....... 525/329.5 |
| 5,356,988 A | * | 10/1994 | Nothnagel ................... 524/556 |
| 5,547,710 A | * | 8/1996 | Satgurunathan et al. .... 427/386 |
| 5,656,685 A | * | 8/1997 | Satgurunathan et al. .... 524/460 |
| 5,686,532 A | * | 11/1997 | Bederke et al. .............. 525/222 |
| 5,739,216 A | * | 4/1998 | Duecoffre et al. .......... 528/438 |
| 5,777,024 A | * | 7/1998 | Killilea et al. ............... 524/590 |
| 6,162,886 A | * | 12/2000 | Bremer et al. ......... 526/318.42 |

FOREIGN PATENT DOCUMENTS

| | | | |
|---|---|---|---|
| EP | 0 523 994 A1 | 1/1993 | .............. C08J/3/07 |
| WO | 93/23486 | 11/1993 | |
| WO | WO-93/23486 A1 | * 11/1993 | ......... C09D/133/06 |

* cited by examiner

Primary Examiner—David W. Wu
Assistant Examiner—Rip A. Lee
(74) Attorney, Agent, or Firm—Pillsbury Winthrop LLP

(57) ABSTRACT

An aqueous crosslinkable coating composition suitable for the provision of thick coatings without incurring carbon dioxide bubble formation comprising:

(A) an aqueous dispersion of at least one hydroxyl- and acid-functional vinyl polymer having a hydroxyl value of 8 to 250 mg KOH/g of polymer and an acid value of 2 to 55 mg KOH/g of polymer, where the contribution of at least 30% of the acid value results from a monocarboxylic acid(s) of formula:

$$CH_2{=}CR^1{-}Q{-}CO_2H \qquad (1)$$

where $R^1$ is H or lower alkyl of 1 to 5 carbon atoms and Q is a spacer group of formula:

$$[-C({=}O)-X-(CH_2)_m-]_k \qquad (2)$$

where X is —O— or —NH—, m is at least 1, preferably 2 or 3, and k is at least 1, preferably 2, 3, 4 or 5; and (B) at least one organic polyisocyanate. The acid of formula (1) preferably comprises β-carboxyethyl acrylate.

36 Claims, No Drawings

AQUEOUS CROSSLINKABLE COATING COMPOSITIONS

This application is the national phase of international application PCT/GB98/00948 filed Mar. 30, 1998 which designated the U.S.

The present invention relates to an aqueous crosslinkable coating composition comprising an aqueous dispersion of a certain hydroxy-functional and acid-functional vinyl polymer(s) and an organic polyisocyanate.

It is known in the art to employ aqueous two-component crosslinkable coating compositions comprising an aqueous dispersion (usually an aqueous latex or aqueous solution) of a vinyl polymer (usually an acrylic polymer) which is both hydroxyl and acid functional, and an organic polyisocyanate, for the provision of clear or pigmented coatings (e.g. paint coatings) which become cured (i.e. crosslinked) on removal of the aqueous carrier medium. The vinyl polymer provides the polymeric binder material of the composition, while the polyisocyanate acts as a crosslinker material for reacting with the hydroxyl groups in the polymer after coating formation to provide curing of the coating via covalent urethane linkages. The acid groups in the vinyl polymer provide or assist aqueous dispersion stability (or, if in sufficient amount and/or of a sufficiently low pK, water solubility) and enhanced substrate adhesion of the resulting coating, and may also contribute to curing by reaction with the polyisocyanate. Such compositions are considered an advantageous improvement over organic solvent-based compositions using hydroxyl-functional polymer and polyisocyanate components because of the entire or substantial replacement of environmentally suspect organic solvents with water as the carrier medium for the composition.

For example, patent publications such as AU 41135/89 (equivalent to EP 0358979), U.S. Pat. Nos. 4,618,390, 4,442,145, 5,304,400, and AU 9470010, disclose coating compositions based on a hydroxyl-functional and acid-functional acrylic polymer and an organic polyisocyanate, the acrylic polymer being in aqueous solution and/or dispersion, and the polyisocyanate normally being present in emulsified form in the acrylic polymer dispersion. The preferred monomer(s) providing the acid functionality is invariably acrylic acid and/or methacrylic acid (being used in all the worked examples), although other carboxylic acids such as crotonic acid, itaconic acid, maleic acid or anhydride, phthalic acid or anhydride, or their half esters, have also been mentioned; sometimes unsaturated sulphonic acids are also mentioned as being usable, normally in addition to the use of an unsaturated carboxylic acid monomer.

We have, nevertheless, encountered a problem when forming films from such prior art carboxylic acid-containing compositions, viz that the resulting cured films often tend to contain entrapped carbon dioxide bubbles which mars their appearance and protective capability (the carbon dioxide bubbles becoming entrapped in the films during the curing process). This is particularly a problem found when using more than very low levels of acid monomers such as the hitherto invariably employed acrylic acid or methacrylic acid when preparing the acid-bearing polymer (e.g. above about 1.5 to 3 weight % of such monomer(s) based on the total weight of monomers used for polymerisation); such more than minimal levels are, nevertheless, normally desirable to promote adequate dispersion stability and resulting coating substrate adhesion. The problem is also more apparent the thicker the resulting coatings that are prepared. For example, in the paper by Vandervoorde and Brinkman, "Isocyanate Free Two Component Waterborne Coatings", presented during "High Performance Waterborne Coatings", Forum de la Connaissance, Paris, Nov. 26–27, 1996, it is mentioned that, in contrast to all-acrylic aqueous systems, aqueous two pack polyurethane systems (i.e. aqueous vinyl/acrylic polymer plus polyisocyanate systems) develop a strong tendency for gas-bubble formation when applied in thick layers (e.g. up to 130 μm as used for the all acrylic system).

We have now discovered new two-pack aqueous vinyl polymer/polyisocyanate compositions which, in contrast to many of the prior art systems discussed above, may be applied to form thick coatings, e.g. up to 200 μm or even 300 μm dry thickness, without incurring any formation of carbon dioxide bubbles.

According to the present invention there is provided an aqueous crosslinkable coating composition comprising:

(A) an aqueous dispersion of at least one vinyl polymer which is hydroxyl- and acid-functional, said aqueous dispersion being a dispersion of said at least one vinyl polymer in a liquid carrier medium at least 50% by weight of which is water, and in which:

(i) said at least one vinyl polymer has a hydroxyl value within the range of from 8 to 250 mg KOH/g of solid polymer;

(ii) said at least one vinyl polymer has an acid value within the range of from 2 to 55 mg KOH/g of solid polymer, where the contribution of at least 30% of the acid value results from the acid groups of polymerised units in the vinyl polymer of a monocarboxylic acid(s) of formula:

$$CH_2=CR^1-Q-CO_2H \qquad (1)$$

where $R^1$ is H or lower alkyl of 1 to 5 carbon atoms and Q is a non carboxyl-containing spacer group providing a spacer chain of at least 3 atoms, wherein the spacer group Q is of the formula:

$$[-C(=O)-X-(CH_2)_m-]_k \qquad (2)$$

where X is —O— or —NH—, m is at least 1, preferably 2 or 3, and k is at least 1, preferably 1, 2, 3, 4, or 5; and (B) at least one organic polyisocyanate.

There is also provided according to the invention a method of coating a substrate, which method comprises applying a coating composition as defined above to a substrate, causing or allowing the aqueous carrier medium of the composition to be removed, and developing crosslinking of the coating that has been applied to the substrate.

There is further provided according to the invention a crosslinked coating which has been derived from a coating composition as defined above.

There is further provided according to the invention a coated substrate which has been prepared by applying a coating composition as defined above to a substrate, causing or allowing the aqueous carrier medium of the composition to be removed, and developing crosslinking of the coating that has been applied to the substrate.

By an aqueous dispersion of the vinyl polymer(s) of component (A), is meant herein a dispersion of the component in a liquid carrier medium of which water is the principal component (at least 50% by weight, more usually at least 80% by weight of the carrier medium). The vinyl polymer component may be dispersed as an aqueous emulsion (that is to say, an aqueous latex), suspension or solution. However, the at least one vinyl polymer of component (A)

is usually in the form of colloidally dispersed particles, i.e. in the form of an aqueous latex.

It has thus been found that the crosslinkable coating composition of this invention, which includes a hydroxyl- and acid-functional vinyl polymer(s) as defined in which at least 30% of the acid value thereof results from polymerised units in the polymer of a monocarboxylic acid(s) of the above-defined formula, rather than solely from hitherto a conventionally-employed unsaturated acids such as acrylic and methacrylic acid, allows one to form coatings (which may be very thick if desired) without any unsightly porosity resulting from gas bubble formation. The invention coating compositions are particularly useful for providing bubble-free coatings of dry thickness within the range of from 140 to 300 μm.

The acid value range quoted above refers to the acid groups when in their free (i.e. unneutralised) form although such groups may be (in part or in total) in neutralised form in the invention compositions, and indeed this is often preferred.

With regard to the carboxyl-containing monomer of formula (1), $R^1$ is preferably H or methyl, and is more preferably H. The spacer group Q preferably provides a spacer chain of at most 20 atoms. A preferred range for the spacer chain of Q is therefore 3 to 20 atoms.

It is especially preferred in one embodiment of the present invention that the unsaturated carboxyl-containing monomer (s) of formula (1) is or includes β-carboxyethyl acrylate, (hereinafter β-CEA), which has the formula:

$$CH_2=CH-C(=O)-O-CH_2CH_2-CO_2H \quad (3)$$

According to its method of manufacture, the β-CEA that is available commercially may well contain a proportion of acrylic acid (AA), and also a proportion of higher AA adducts $(AA)_t$ where t is 3 or more, and usually 3, 4, 5 and 6. β-CEA of course is the diadduct of AA on this basis (t=2), i.e. $(AA)_2$ and acrylic acid AA is the mono compound (t=1), i.e. $(AA)_1$. For example β-CEA as supplied by Rhone Poulenc is found to contain approximately 16 weight % AA (i.e. $(AA)_1$), 29 weight % of β-CEA (i.e. $(AA)_2$), 26 weight % of $(AA)_3$, 17 weight % $(AA)_4$, 8 weight % $(AA)_5$ and 4 weight % of $(AA)_6$ (i.e. the amount of $(AA)_t$ where t=3 or more is approximately 55 weight %). The contribution of AA to the acid value of a vinyl polymer of component (A) if using such a β-CEA product would thus be about 35%, with the remainder of the acid value coming from β-CEA (i.e. $(AA)_2$) and higher adducts $((AA)_t$ where t=3, 4, 5 and 6). Other suppliers may supply a purer form of β-CEA. Thus β-CEA supplied by Bimax contains approximately 2 weight % AA (i.e. $(AA)_1$), 37 weight % of β-CEA (i.e. $(AA)_2$), 30 weight % of $(AA)_3$, 18 weight % $(AA)_4$, 9 weight % of $(AA)_5$ and 4 weight % of $(AA)_6$ (i.e. the amount of $(AA)_t$ when t is 3 or more is about 61 weight %). The contribution of AA to the acid value of a vinyl polymer of component (A) if using such a β-CEA product would thus be about 12% with the remainder coming from β-CEA (i.e. $(AA)_2$) and higher adducts $((AA)_t$ when t=3, 4, 5 and 6).

It will be noted that such commercial mixtures will still contain well over 80 weight % of monocarboxylic acids falling within the broadest definition of formula (1) quoted above and will therefore be suitable for the provision of at least 30% of the acid value of the vinyl polymer(s) of component (A).

Accordingly an especially preferred acid monomer mixture of formula (1) for providing at least 30% of the defined acid value of the vinyl polymer of component (A) is:

(a) an acid of formula:

$$CH_2=CH-C(=O)-O-CH_2CH_2-CO_2H \text{ (i.e. β-CEA)} \quad (3)$$

and
(b) one or more acids of formula:

$$CH_2=CH[C(=O)-O-CH_2CH_2]_qCO_2H \quad (4)$$

where q is 2 or more, preferably 2, 3, 4 and 5.

In such an acid mixture, the acid(s) of (b) will (as commercially available) have a mixture of acids of formula (4) with q=2, q=3, q=4 and q=5, these acids corresponding to $(AA)_3$, $(AA)_4$, $(AA)_5$ and $(AA)_6$ mentioned above. In the β-CEA from Rhone Poulenc the weight % contribution of such acids to the total amount of acid monomer is 55 weight %, and they provide an acid value contribution of 33% to the vinyl polymer of component (A). In many cases the proportion of (a) acid will be 25 to 45 weight % while the proportion of (b) acid or acids will be 75 to 55 weight %, based on the weight of (a) and (b) acids.

It may here be mentioned that there is disclosed in WO 93/23486 aqueous crosslinkable coating compositions comprising a vinyl (preferably acrylic) polymer, which is acid functional by virtue of copolymerised β-CEA units and optionally hydroxyl functional, and a carboxyl-reactive compound for providing crosslinking with the acid-functional polymer. The only discussed and exemplified crosslinker materials however are polyvalent metal ions, polyepoxide compounds, and polymers having β-hydroxyester groups, and there is no mention therein to employ a polyisocyanate as the crosslinker material or of the surprising advantages that are obtained when this is done using the limitations as defined herein. Indeed, the reduction in carbon dioxide bubble formation when employing the compositions of the present invention is all the more surprising when it is considered that the disclosure of WO 93/23486 teaches that β-CEA results in a more effective crosslinking reaction with carboxyl-reactive materials than conventionally employed acrylic acid or methacrylic acid, while on the other hand it is known that the reaction between carboxylic acid and isocyanate generates carbon dioxide.

As indicated above the acid groups of the polymerised units derived from the acid monomer(s) of formula (1) provide at least 30% of the acid value of the vinyl polymer (s) of component (A), which acid value can vary from 2 to 55 mg KOH/g of solid polymer. More preferably the contribution from the acid groups of said acid(s) of formula (1) provides at least 40% of the acid value of the polymer, and still more preferably at least 70% of the acid value.

The acid value of the at least one vinyl polymer is more preferably within the range of from 4 to 45 mg KOH/g of solid polymer, and still more preferably 8 to 35 mg KOH/g of solid polymer.

The remainder of the acid value (if any), may be provided by acid groups from polymerised units of other olefinically unsaturated acid(s) in the polymer—i.e. the contribution to the acid value of the polymer provided by such groups is within the range of 0 to 70%, preferably 0 to 60%, and more preferably 0 to 30%. These other acid monomers are preferably other unsaturated monocarboxylic acids, and in particular are one or both of acrylic acid and methacrylic acid (although other possible carboxylic acid monomers include itaconic acid, fumaric acid, maleic acid and maleic anhydride and their half esters, and the half esters of phthalic anhydride and hydroxy functional alkyl (meth)acrylates). We have thus found that the use of minor amounts of such alternative acid-bearing monomer(s) in forming the vinyl polymer (as defined) does not vitiate the bubble-free nature of the resulting coatings. Commercially available β-CEA, such as those materials discussed above, will in any case often contain from about 2 to about 20 weight % of acrylic acid, the remainder being β-CEA (about 25 to 43 weight %) and higher adducts (about 55 to 73 weight %).

By a vinyl polymer is meant herein a polymer derived from the addition polymerisation (normally by a free-radical process) of at least two, more usually at least three olefinically unsaturated monomers, i.e. the vinyl polymer will be a copolymer of such olefinically unsaturated monomers.

Preferably, the at least one vinyl polymer is an acrylic polymer, by which is meant a vinyl polymer derived from monomers of which ≧50 weight % have the formula;

$$CH_2=CHR^2-C(=O)-Y-R^3 \quad (5)$$

where $R^2$ is H or methyl, $R^3$ is alkyl or hydroxylalkyl (preferably 1 to 18C, more preferably 1 to 8C), cycloalkyl or hydroxycycloalkyl (preferably 5 to 12 ring C atoms), or H, and Y is —O— or —NH—, with the proviso of course, that any monomers providing hydroxyl or acid functionality are subject to the limitations in the resulting polymer as defined above.

As defined above, the vinyl polymer(s) of component (A) has a hydroxyl value within the range of from 8 to 250 mg KOH/g of solid polymer. Such hydroxyl functionality is intended to mean alcoholic hydroxyl functionality and will normally be provided by the use of at least one hydroxyl-bearing monomer in the polymerisation to form the polymer. More preferably, the hydroxyl value is within the range of from 20 to 175 mg KOH/g of polymer, still more preferably 35 to 140 mg KOH/g of polymer.

The average hydroxyl functionality of the vinyl polymer (s) of component (A) is preferably ≧2, more preferably ≧2.3 and still more preferably ≧3.5. (Average hydroxyl functionality=average number of hydroxyl groups per polymer molecule).

It will now be evident that the vinyl polymer(s) of component (A) is normally formed from the copolymerisation of an olefinically unsaturated acid-bearing monomer(s), an olefinically unsaturated hydroxyl-bearing monomer(s), and optionally but preferably an olefinically unsaturated non-acid, non-hydroxyl-bearing monomer(s).

The acid-bearing monomer(s), which is subject to the limitations in the resulting polymer as defined above (with regard to type and amount) is at least a monomer of formula (1), most preferably β-CEA (or a mixture of β-CEA with higher homologues as discussed above), and optionally one or more additional carboxylic-acid functional monomers preferably selected from one or more of acrylic acid, methacrylic acid, itaconic acid, crotonic acid, fumaric acid, maleic acid, and maleic anhydride, most preferably one or both of acrylic acid and methacrylic acid.

The hydroxyl-bearing monomer(s), which is also subject to the limitation in the resulting polymer as defined above, is usually a hydroxy-functional ester of acrylic acid, methacrylic acid, maleic acid, or fumaric acid. Examples of such monomers include hydroxy functional alkyl (preferably 1 to 18C) (meth)acrylates such as 2-hydroxy ethylacrylate, 2-hydroxy ethylmethacrylate, 2-hydroxy propylacrylate, 3-hydroxy propylacrylate, 2-hydroxy propylmethacrylate, 3-hydroxy propylmethacrylate, 4-hydroxy butylacrylate, 4-hydroxy butylmethacrylate, hydroxy stearylacrylate, hydroxy stearylmethacrylate; dihydroxy alkyl (preferably 1 to 5C) adducts of maleic acid, fumaric acid, and phthalic acid; polyethylene oxide or polypropylene oxide functionalised hydroxyl functional (meth)acrylates such as the commercially available materials known as BISOMER PPM5S, BISOMER PPM6E (International Specialty Chemicals); Caprolactone acrylate monomers such as the commercial available material known as TONE M100 Monomer (Union Carbide). Other examples include (4-hydroxymethyl cyclohexyl)-methylacrylate (Mitsubishi Chemical); and Blemmer PE-90, Blemmer PE-200, and Blemmer PE-350 (polyethylene glycol methacrylates of molecular weights 163–173, 261–303 and 387–468 respectively); Blemmer 7-PEP-350B($CH_2=C(CH_3)-C(=O)-(EO)_r(PO)_s-H$ where EO is polyethylene oxide, PO is polypropylene oxide and the molecular weight is about 450); and Blemmer-GLM (glycerol dimethacrylate) (all Nippon Oil and Fats Co.).

The monomers used to make the vinyl polymer will (as mentioned above) normally also include non-acid, non-hydroxyl bearing monomer(s), which will facilitate the provision or adjustment of other properties of the polymer which may be desired, e.g. glass transition temperature Tg. Examples of such monomer(s) include conjugated dienes; styrene or substituted styrenes; olefines such as ethylene or propylene; vinyl halides such as vinylidene chloride and vinyl chloride; olefinically unsaturated amides; vinyl esters; vinyl ethers; olefinically unsaturated nitriles; heterocyclic vinyl compounds; vinyl sulphonates; diesters of fumaric and maleic acid; and, in particular, esters of acrylic acid and methacrylic acid of formula:

$$CH_2=CR^4CO_2R^5 \quad (6)$$

where $R^4$ is H or methyl and $R^5$ is optionally substituted (e.g. optionally halo substituted) alkyl of 1 to 20 carbon atoms (more preferably 1 to 8 carbon atoms) or cycloalkyl of 5 to 12 ring carbon atoms but which excludes acid-containing and hydroxy-containing groups. More specific examples of such monomers include alkylesters, (chloro) alkyl and (fluoro)alkyl esters such as methyl acrylate, ethyl acrylate, n-propyl acrylate, n-butyl acrylate, i-butyl acrylate, t-butyl acrylate, n-octyl acrylate, 2-ethylhexyl acrylate, lauryl acrylate, isopropyl acrylate, isobornyl acrylate, cyclohexyl acrylate, methyl α-chloroacrylate, n-propyl α-chloroacrylate, n-butyl α-chloroacrylate, β-chloroethyl acrylate, β-chlorobutyl acrylate, fluorinated acrylates and methacrylates (such as the fluoro analogues of the above chloroacrylates), methyl methacrylate, ethyl methacrylate, n-propyl methacrylate, isopropyl methacrylate, n-butyl methacrylate, i-butyl acrylate, t-butyl methacrylate, isobornyl methacrylate, cyclohexyl methacrylate, 2-ethylhexyl methacrylate, diethyl maleate, diethyl fumarate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene, nitriles such as acrylonitrile and methacrylonitrile; aryls such as styrene, α-methyl styrene, o-methyl styrene, m-methyl styrene, p-methyl styrene, pentachlorostyrene, o-chlorostyrene, m-chlorostyrene, p-chlorostyrene and p-cyanostyrene; conjugated dienes or chlorodienes such as butadiene and chloroprene and vinyl-substituted heterocyclic imines such as 2-vinyl-pyridine and vinyl carbazole. Other monomers include di-hydroxyalkyl (meth)acrylate adducts of organic diisocyanates, such as the di-hydroxyethyl methacrylate adduct of a $C_9H_{18}$ diisocyanate sold by Röhm GmbH as PLEX 6661-0.

Typically a vinyl polymer component of component (A) will be derived from a monomer system which contains 0.5 to 12.5 weight % of a monomer(s) of formula (1), preferably β-CEA, or a mixture with its higher homologues as mentioned above (more preferably 1 to 10 weight %, still more preferably 2 to 7.5 weight %); 0 to 3 weight % of an alternative carboxylic acid monomer, preferably one or both of acrylic acid and methacrylic acid (more preferably 0 to 2.5 weight %, still more preferably 0 to 2 weight %) (and subject to the above-defined limitation concerning the contribution of such acids to the acid value of the polymer); 2 to 60 weight % of a hydroxyl functional monomer(s), preferably selected from one or more of 2-hydroxyethyl acrylate or methacrylate, 2-hydroxylpropyl acrylate or methacrylate, 3-hydroxyethyl acrylate or methacrylate, and 4-hydroxybutyl acrylate or methacrylate (more preferably 6 to 40 weight %, still more preferably 8 to 35 weight %) (and subject to the above defined limitation concerning the contribution of such hydroxyl monomer(s) to the hydroxyl value of the polymer); and 27.5–97.5 weight % of a non-acid, non-hydroxyl monomer(s), preferably selected from one or more C1–C8 alkyl acrylates or methacrylates, examples of which are methyl methacrylate, n-butyl acrylate, n-butyl methacrylate, ethyl acrylate, and 2-ethylhexyl acrylate, one or more cycloalkyl acrylates or methacrylates of 5 to 12 ring C atoms, examples of which are isobornyl methacrylate and cyclohexyl methacrylate, and one or more styrenes examples of which are styrene itself and a-methyl styrene (more preferably 35 to 93 weight %, still more preferably 50 to 85 weight %). (All weight % values are based on the total weight of monomers used for the polymerisation). The non-acid, non-hydroxyl monomer(s) will often be selected so as to provide or contribute to a desired Tg for the polymer, and for this purpose will often comprise a mixture of hard and soft monomers, typical examples of hard monomers being methyl methacrylate, isobornyl methacrylate, cyclohexyl methacrylate and styrenes, and typical examples of soft monomers being n-butyl acrylate, 2-ethylhexyl acrylate and ethyl acrylate. [A "hard" monomer is one which when homopolymerised yields a polymer of high Tg, say Tg>20° C., often >60° C., while a "soft" monomer is one which when homopolymerised yields a polymer of low Tg, say ≦0° C.].

A more specific example of a vinyl polymer of component (A) is an acrylic polymer derived from a monomer system which comprises 1 to 6 weight % of an acid monomer(s) of formula (1) (preferred examples of which have been given above), 0 to 3 weight % of an alternative carboxylic acid monomer(s) (preferred examples of which have been given above), 10 to 40 weight % of a hydroxyl functional monomer(s) (preferred examples of which have been given above), 10 to 40 weight % of a hard non-acid, non-hydroxyl acrylic monomer(s) such as one or more of methyl methacrylate, isobornyl methacrylate and cyclohexyl acrylate, 1 to 79 weight % of a soft non-acid, non-hydroxyl acrylic monomer(s) such as one or more of n-butyl acrylate, 2-ethylhexyl acrylate and ethyl acrylate, and 0 to 10 weight % of other vinyl monomer(s).

Another more specific example of a vinyl polymer of component (A) is a styrene-acrylic polymer derived from a monomer system which comprises 1 to 6 weight % of an acid monomer(s) of formula (1) (preferred examples of which have been given above), 0 to 3 weight % of an alternative carboxylic acid monomer(s) (preferred examples of which have been given above), 5 to 30 weight % of a hydroxy functional monomer(s) (preferred examples of which have been given above), 10 to 50 weight % of hard styrenic monomer(s) which is one or both of styrene and a-methyl styrene, 10 to 84 weight % of a soft non-acid, non-hydroxyl acrylic monomer(s) such as one or more of n-butyl acrylate, 2-ethylhexyl acrylate, and ethyl acrylate, and 0 to 10 weight % of other vinyl monomer(s).

The vinyl polymer(s) of component (A) preferably has a weight average molecular weight Mw≦200,000 Daltons, more preferably ≦100,000 Daltons, and still more preferably ≦50,000 Daltons. However, these maximum molecular weight values are not intended to be limiting, and e.g. Mw values of up to 1,000,000 and higher are feasible. The preferred minimum value for Mw is 2,000 Daltons more preferably 5,000 Daltons and still more preferably 10,000 Daltons. Thus a particularly preferred range for Mw is 10,000 to 50,000 Daltons. (Polymer molecular weights may be determined by gel permeation chromatography calibrated using an appropriate known polymer as standard).

The Tg of the polymer is preferably within the range of −50 to 80° C., more preferably 0 to 50° C. (Tg values may be determined experimentally using differential scanning calorimetry DSC, or calculated using the Fox equation).

The vinyl polymer(s) of component (A) of the aqueous polymer composition is as mentioned above made using an addition, preferably free-radical, polymerisation process, and this is normally an aqueous polymerisation process (although, alternatively, a solution/dispersion process could in principle be used, as described in U.S. Pat. No. 5,304,400). Such an aqueous emulsion polymerisation process may, in principle, be an aqueous solution polymerisation process to produce an aqueous solution (partial or complete), if this is required, but is more usually an aqueous emulsion polymerisation process to form an aqueous polymer emulsion (i.e. latex). Such an aqueous emulsion polymerisation process is usually, in itself, extremely well known and need not be described in great detail. Suffice to say that such a process involves dispersing the monomers in an aqueous medium and conducting polymerisation using a free-radical initiator (normally water soluble) and (usually) appropriate heating (e.g. 30 to 120° C.) and agitation (stirring) being employed. The aqueous emulsion polymerisation can be effected using one or more conventional emulsifying agents (surfactants) [e.g. anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids, fatty alcohols, ethoxylated fatty acids and/or fatty amides, and Na, K and $NH_4$ salts of fatty acids such as Na stearate and Na oleate. The alkyl groups in such surfactants (where used) are long chain with e.g. 8 to 22 carbon atoms. Aryl-containing analogues of the alkyl-containing surfactants are also useful, particularly those with alkyl substituted aryl groups such as nonylphenol or triisobutylphenol. Other surfactants include phosphonate and phosphate analogues of such sulphonates and sulphates. Nonionic surfactants include polyglycol ether compounds composed of from 30 to 100 ethylene oxide groups and/or propylene oxide groups linked to long chain alkyl or aryl (particularly alkyl substituted aryl) groups of the type described above (e.g. ethylene oxide or propylene oxide modified lauryl alcohols or stearyl alcohols). Other anionic surfactants include such alkyl or (alk)aryl groups linked to sulphonic acid groups, sulphuric acid half ester groups (linked in turn to polyglycol ether groups), phosphonic acid groups or carboxylic acid groups. Cationic surfactants include such alkyl, aryl or (alk)aryl groups linked to ammonium groups, particularly tertiary ammonium salt groups. The amount of emulsifier used is preferably 0.01 to 10% more usually 0.3 to 5% by weight based on the weight of total monomer(s) charged]. The polymerisation can employ conventional free radical initiators [e.g. water-soluble peroxy compounds such as hydrogen peroxide, t-butyl-hydroperoxide, cumene hydroperoxide, t-butyl per 2-ethyl hexanoate, t-butyl perbenzoate, t-butyl perpivalate, t-butyl pivalate, di-t-butyl peroxide, dicyclohexyl or dibenzoyl peroxy dicarbonates; water-soluble inorganic persulphates such as $NH_4$ persulphate, K persulphate and Na persulphate; water-soluble azo compounds such as 4,4'-azobis(4-cyanovaleric acid) or its salts, and 2,2'-azobis (2-amidinopropane)dihydrochloride. Redox systems may be used formed of an oxidising component, like alkali metal or ammonium persulphate or hydrogen peroxide and a suitable reducing agent, e.g. isoascorbic acid or Na bisulphate. The amount of the total initiator system (i.e. including a reducer if used) is generally within the range of from 0.01 to 5%, more usually 0.5 to 4%, based on the weight of total monomer(s) charged).

An emulsion polymerisation process used for making the vinyl polymer(s) of component (A) may be carried out using an "all-in-one" batch process (i.e. a process in which all the materials to be employed are present in the polymerisation medium at the start of polymerisation) or a semi-batch process in which one or more of the materials employed (usually at least one of the monomers), is wholly or partially fed to the polymerisation medium during the polymerisation. Although not preferred, fully continuous processes could also be used in principle.

The polymerisation process employed to prepare the vinyl polymer(s) must, in many cases, be such that a low molecular weight polymer is formed (e.g. $Mw \leq 50,000$), and for this purpose a suitable chain transfer agent (CTA) for molecular weight control is employed in the polymerisation. Suitable CTA's include mercaptans like n-dodecylmercaptan, n-octylmercaptan, t-dodecyl mercaptan, mercaptoethanol, iso-octyl thioglycolurate, mercapto carboxylic acids having 2 to 8 carbon atoms, and their esters, examples of which are 3-mercapto propionic acid and 2-mercapto propionic acid. Also halogenated hydrocarbons such as carbonbromo compounds examples of which are carbon tetrabromide and bromotrichloromethane can be used.

It is also possible to effect molecular weight control using a process known as catalytic chain transfer polymerisation. This process is that where a low molecular weight polymer is produced using the technique of radical polymerisation, using a free-radical initiator, in which molecular weight is controlled using a catalytic amount of a transition metal complex, and in particular a cobalt chelate complex assumed to be acting as a CTA, this technique being known in the art as a catalytic chain transfer (CCT) polymerisation. Examples of particularly suitable catalytic chain transfer agents are described in WO 96/13527.

In one embodiment of the invention the vinyl polymer(s) of component (A) is made using a sequential polymerisation process, wherein a first phase of the polymer (which may alternatively be considered as a separate polymer in its own right) is prepared in the presence of a second phase (which, again, may alternatively be considered as a separate polymer in its own right). In such cases the polymer weight ratio of the first phase/second phase is preferably 10/90 to 80/20, more preferably 20/80 to 70/30. Also the Tg of the first phase is generally $\geq 65°$ C. and the Tg of the second phase is generally $\leq 45°$ C. The hydroxyl value of the first phase is preferably within the range of from 8 to 40 mg KOH/g of polymer, and the hydroxyl value of the second phase is preferably within the range of from 8 to 250 mg KOH/g of polymer, more preferably 20 to 175 mg KOH/g of polymer.

In another embodiment of the invention the vinyl polymer (s) of component A is again made using a sequential polymerisation process as described above, but the polymer ratio of the first phase/second phase is preferably 90/10 to 40/60, more preferably 80/20 to 60/40. Also the Tg of the first phase is generally $\leq 45°$ C. and the Tg of the second phase is generally $\geq 65°$ C. The hydroxyl value of the first phase is preferably within the range of from 8 to 250 mg KOH/g of solid polymer, and the hydroxyl value of the second phase is preferably within the range from 8 to 30 mg KOH/g, of solid polymer.

The acid and hydroxyl values of the polymer component in such sequential polymer systems (i.e. overall of both polymer phases) will still of course lie within the ranges defined above for the vinyl polymer(s).

The pH of the aqueous composition is normally within the range of 2 to 10, more preferably within the range 5 to 9 and most preferably between 6.4 and 8.5. As made, however, the vinyl polymer dispersion (usually latex) will usually have an acid pH (because of the acid monomer used, and possibly additionally because of anionic emulsifier or acid initiator which might be used). Consequently, it may well be desirable to treat the vinyl polymer dispersion subsequent to its preparation with a base in order to raise its pH. Examples of suitable bases for this purpose include aliphatic amines of molecular weight between 31 and 200 g/mole such as trimethylamine, triethylamine, tributylamine, dimethyl ethanolamine, methyl diethanolamine, triethanolamine, morpholine, N-methyl morpholine, and inorganic bases such as ammonia, NaOH, KOH and LiOH. The amount used should be sufficient to raise the pH of the vinyl dispersion as made to the desired level. It is, nevertheless, also possible to perform the aqueous polymerisation to form the vinyl polymer in a buffered environment such that the pH of the final polymer dispersion is already at the desired level.

The aqueous dispersion of the at least one vinyl polymer (component (A)) preferably has a polymer solids content within the range of from 20 to 80 weight % (more preferably 25 to 55 weight %) on total solids basis and a viscosity preferably within the range of from 1 to 20,000 mPa.s (more preferably 10 to 15,000 mPa.s), as measured at 25° C. on a Brookfield Viscometer.

The organic polyisocyanate component of the invention composition (component (B)) is preferably present in component (A) in emulsified form (although some combinations of polyisocyanate and vinyl polymer dispersion can result in more solution-like mixtures as far as the polyisocyanate is concerned). The polyisocyanate may itself be self waterdispersible (by virtue e.g. of incorporated hydrophilic groups, such as polyethylene oxide chains) but this is not essential, since the dispersed vinyl polymer of component (A) can sometimes simultaneously serve as an emulsifier for the added polyisocyanate. External surfactant(s) may also be used to assist in the emulsification, but, again, such use is not essential and depends on the nature/structure of the type of polyisocyanate used. The polyisocyanate may be mixed into the component (A) by any suitable technique—simple stirring at ambient temperature usually being sufficient. It may sometimes be useful to employ an organic liquid (e.g. ethylacetate) to facilitate mixing and decrease viscosity.

The polyisocyanate component may be any organic polyisocyanate containing (cyclo)aliphatically, aryl-aliphatically and/or aromatically bound NCO groups which is normally liquid at ambient temperature. More preferably, it is a polyisocyanate (or polyisocyanate mixture) having only aliphatically and/or cycloaliphatically bound isocyanate groups (and average NCO functionality of 2.1 to 5).

Suitable polyisocyanates include those based on 1,6-hexane-diisocyanate, 1-isocyanato-3,3,5-trimethyl-5-isocyanatomethylcyclohexane (isophorone diisocyanate)

and/or bis-isocyanatocyclohexyl)-methane, namely the biuret, urethane, uretdione and/or isocyanurate derivatives of such diisocyanates. Preferred aliphatic polyisocyanates include biuret polyisocyanates based on 1,6-hexane-diisocyanates and which are based on mixtures of N,N',N''-tris-(6-isocyanatohexyl)-polyisocyanates with small quantities of its higher homologues. Also preferred are the cyclic trimers of 1,6-hexane-diisocyanate which are based on N,N', N''-tris-(6-isocyanatohexyl)-isocyanurate in admixture with small quantities of its higher homologues. Also preferred are such trimers when modified with polyethylene oxide chains to render them water-dispersible.

Aromatic or aryl-aliphatic polyisocyanates which may be used include those based on 2,4-diisocyanato-toluene or commercial mixtures thereof with 2,6-diisocyanato-toluene, or based on 4,4'-diisocyanatodiphenylmethane or mixtures thereof with its isomers and/or higher homologues. Another such polyisocyanate which may be used is meta-tetramethylxylylene diisocyanate (TM X DI).

For a more comprehensive disclosure on suitable polyisocyanates for use in the invention composition, reference is made to the disclosures of AU 41135/89, DE 1670666, DE 3900653, EP 336205, EP 339396, U.S. Pat. No. 5,304,400, CA 2090144 and U.S. Pat. No. 4,618,390, reference to which is incorporated herein for this purpose.

A particularly useful polyisocyanate for use in the present invention is the product Bayhydur 3100 (Bayer AG); this is a polyethylene glycol functionalised isocyanurate and is widely available commercially.

The invention compositions preferably incorporate the defined vinyl polymer(s) and polyisocyanate(s) at levels to provide an NCO/OH equivalent ratio (based on the isocyanate groups of component (B) and the hydroxyl groups of component (A)) within the range from 0.3/1 to 5/1, more preferably 0.5/1 to 2/1, and still more preferably 0.7/1 to 1.2/1.

The coating compositions of the invention may find applicability in a wide range of fields (for the purposes of e.g. protective, decorative, adhesive, sealant or graphic arts coating) and may be employed as surface coating compositions in, for example, paints, lacquers, varnishes and inks.

As coating compositions they may be applied to a variety of substrates, such as metals; wood; wood-based materials (such as particle board, fibreboard and paper); cloth; leather; glass; mineral building materials such as stone, concrete, lime- and/or cement-based plasters, gypsum-containing surfaces, fibre-cement building material and gypsum-containing surfaces; unfoamed plastics; and plastics foam. Application may be by any conventional method including brushing, dipping, flow coating, spraying, roller coating, pad coating and the like.

The coating compositions may contain other ingredients, additives or auxiliaries, such as pigments, dyes, emulsifiers (surfactants), pigment dispersion aids, levelling agents, anti-cratering agents, antifoam agents, sedimentation inhibitors, heat stabilisers, UV absorbers, antioxidants, fillers and so on. Other types of polymer and polymer dispersions may be included in the invention compositions—e.g. acrylic polymer emulsions and aqueous polyurethane dispersions. For example, an acrylic or acrylic or acrylic-styrene polymer emulsion with an average particle size preferably <100 nm and a Tg preferably >75° C. may be added (typically in an amount of about 10 weight % solid/solid), e.g. to improve properties such as the early-block resistance or the tack-free time of the emulsion.

It is also possible to incorporate coalescing agents and/or plasticisers into the composition to optimise or fine tune film-forming properties, usually in an amount of 0 to 55 weight %, more preferably 1 to 20 weight %, still more preferably 2–10 weight %, based on the weight of the aqueous vinyl polymer dispersion. Examples of coalescing agents that may be used include dipropyleneglycol-n-butyl ether (Dowanol DPnB of Dow), 2,2,4-trimethylpentane-1, 3-diol mono-isobutyrate (Texanol of Eastman Chem.), butyl glycol, and butydiglycol acetate. Examples of plasticisers include dioctyl phthalate, diesters of adipates, phthalates and fumarates, where the C chain length of the alcohol groups is preferably $\geq 4$ C. and the C chain length of both alcohol groups may be the same or different. Other additives include low molecular weight (usually $\leq 380$ Daltons) crosslink density increasing water-soluble mono or (preferably) polyhydric alcohols examples of which include ethylene glycol, propylene glycol, isomeric butane diols, the polyethylene glycols or polypropylene glycols, trimethylol propane, pentaerythritol, and glycerine.

Such other ingredients, additives and auxiliaries (as mentioned above) are usually best incorporated into component (A) of the compositions before the addition of component (B).

The coating compositions once applied may be allowed to dry naturally at ambient temperature, or the drying process may be accelerated by heat. Crosslinking can be developed by allowing to stand for a prolonged period at ambient temperature (several days) or by heating at an elevated temperature for a much shorter period of time (in which case the drying and crosslink development steps can be combined into one operation if desired).

The present invention is now illustrated, but not limited, by reference to the following examples. Unless otherwise specified all parts, percentages and ratios are on a weight basis. The prefix C before an example number denotes that it is comparative.

In the examples the following abbreviations or trade names are employed:

| | | |
|---|---|---|
| BA | = | n-butyl acrylate |
| EA | = | ethyl acrylate |
| MMA | = | methyl methacrylate |
| HEMA | = | 2-hydroxyethyl methacrylate |
| β-CEA (Rhone Poulenc)* | = | β-carboxyethyl acrylate (containing AA and higher homologues of β-CEA). |
| AA | = | acrylic acid |
| Disponil FES993IS (Henkel) | = | lauryl ethersulphate (12EO) Na salt (surfactant) |
| EO | = | ethylene oxide |
| DMEA | = | dimethylamino ethanol |
| Bayhydur 3100 (Bayer) | = | polyethyleneglycol functionalised isocyanate |

[*As discussed earlier this commercial material contains about 16 weight % of AA, about 55 weight % higher adducts than β-CEA, and about 29 weight % of β-CEA itself; however, for convenience the following examples will simply refer to β-CEA as a single material, although it is to be understood that it includes these other acids].

Preparation of Acrylic Polymer Latex AL1

An aqueous acrylic polymer latex AL1 of polymer composition BA/MMA/HEMA/β-CEA=26/37/30/7 was prepared as follows.

A mixture of 731.5 parts of water and 3.2 parts of Disponil FES993IS is charged to a reactor and heated to 65° C. 5 v/v-% of a pre-emulsified monomer feed, comprising 191.4 parts of water, 9.6 parts of Disponil FES993IS, 19.3 parts of dodecyl mercaptan, 200.3 parts of n-butyl acrylate, 285.1 parts of methyl methacrylate, 231.2 parts of 2-hydroxyethyl methacrylate and 53.9 parts of beta-carboxyethyl acrylate, is charged and the mixture is subsequently heated to 75° C. 30 v/v-% of a premixed initiator feed, comprising 2.3 parts of ammonium persulphate, 151.8 parts of water and 9.8 parts of Disponil FES993IS, is charged to the reactor, which is subsequently heated to 85° C. 5 minutes after the desired temperature has been reached, the addition of monomer feed and initiator feed is started. The monomer feed is added over a period of 90 minutes, after which the equipment is rinsed with 100 parts of water; the initiator feed is added over a period of 100 minutes. After both feeds have been added to the reactor, the mixture is kept at 85° C. for 30 minutes. 0.52 parts of t-butyl hydroperoxide, 0.42 parts of iso-ascorbic acid and 8.9 parts of water are added and the mixture is kept at 85° C. for another 30 minutes. The resulting aqueous latex (AL1) is cooled and sieved over a 75 μm filter cloth. The acid value of the latex polymer was 27.3 mg KOH/g of solid polymer, and the hydroxyl value was 129.5 mg KOH/g of solid polymer.

Preparation of Acrylic Polymer Latex AL2

An aqueous acrylic polymer latex AL2 of polymer composition BA/MMA/HEMA/AA=30.65/36.35/30/3 was prepared as follows.

A mixture of 731.5 parts of water and 3.2 parts of Disponil FES993IS is charged to a reactor and heated to 65° C. 5 v/v-% of a pre-emulsified monomer feed, comprising 191.4 parts of water, 9.6 parts of Disponil FES993IS, 19.3 parts of dodecyl mercaptan, 236.2 parts of n-butyl acrylate, 280.1 parts of methyl methacrylate, 231.2 parts of 2-hydroxyethyl methacrylate and 23.1 parts of acrylic acid, is charged and the mixture is subsequently heated to 75° C. 30 v/v-% of a premixed initiator feed, comprising 2.3 parts of ammonium persulphate, 151.8 parts of water and 9.8 parts of Disponil FES993IS, is charged to the reactor, which is subsequently heated to 85° C. 5 minutes after the desired temperature has been reached the addition of monomer feed and initiator feed is started. The monomer feed is added over a period of 90 minutes, after which the equipment is rinsed with 100 parts of water, the initiator feed is added over a period of 100 minutes. After both feeds have been added to the reactor, the mixture is kept at 85° C. for 30 minutes. 0.52 parts of t-butyl hydroperoxide, 0.42 parts of iso-ascorbic acid and 8.9 parts of water are added and the mixture is kept at 85° C. for another 30 minutes. The resulting aqueous latex AL2 is cooled and sieved over a 75 μm filter cloth. The acid value of the latex polymer was 23.4 mg KOH/g of solid polymer, and the hydroxyl value was 129.5 mg KOH/g of solid polymer.

Preparation of Acrylic Polymer Latex AL3

A mixture of 731.5 parts of water and 3.2 parts of Disponil FES993IS is charged to the reactor the pH is raised to 7.0 with DMEA and heated to 65° C. 5 v/v-% of a preemulsified monomer feed of which the pH is raised to 7.3 using DMEA, comprising 191.4 parts of water, 9.6 parts of Disponil FES993IS, 19.3 parts of dodecyl mercaptan, 185.0 parts of butyl acrylate, 277.3 parts of methyl methacrylate, 231.2 parts of 2-hydroxyethyl methacrylate and 77.1 parts of β-carboxyethyl acrylate, is charged and the mixture is subsequently heated to 75° C. 30 v/v-% of a premixed initiator feed, comprising 2.3 parts of ammonium persulphate, 151.8 parts of water and 9.8 parts of Disponil FES993IS is charged to the reactor, which is subsequently heated to 85° C. 5 minutes after the desired temperature has been reached the addition of the monomer feed and the initiator feed is started. The monomer feed is added over a period of 90 minutes, after which the equipment is rinsed with 100 parts of water. The initiator feed is added over a period of 100 minutes. After both feeds have been added to the reactor, the mixture is kept at 85° C. for another 30 minutes. The resulting aqueous latex AL3 is cooled and sieved over a 75 μm filter Preparation of Acrylic Polymer Latex AL4

An aqueous acrylic polymer latex AL4 of polymer composition BA/MMA/EA/HEMA/β-CEA=19.5/49.5/15/10/6 was prepared as follows.

A mixture of 731.5 parts of water and 3.2 parts of Disponil FES993IS is charged to the reactor and heated to 65° C. 5 v/v-% of a pre-emulsified monomer feed, comprising 191.4 parts of water, 9.6 parts of Disponil FES993IS, 19.3 parts of dodecyl mercaptan, 150.2 parts of butyl acrylate, 381.4 pans of methyl methacrylate, 115.6 parts of ethyl acrylate, 77.1 parts of 2-hydroxyethyl methacrylate and 46.2 parts of β-carboxyethyl acrylate, is charged and the mixture is subsequently heated to 75° C. 30 v/v-% of a premixed initiator feed, comprising 2.3 parts of ammonium persulphate, 151.8 parts of water and 9.8 parts of Disponil FES993IS is charged to the reactor, which is subsequently heated to 85° C. 5 minutes after the desired temperature has been reached the addition of the monomer feed and the initiator feed is started. The monomer feed is added over a period of 90 minutes, after which the equipment is rinsed with 100 parts of water. The initiator feed is added over a period of 100 minutes. After both feeds have been added to the reactor, the mixture is kept at 85° C. for another 30 minutes. The resulting aqueous latex AL4 is cooled and sieved over a 75 μm filter cloth. The acid value of the latex polymer was 23.4 mg KOH/g of solid polymer, and the hydroxyl value was 43.2 mg KOH/g of solid polymer.

Preparation of Acrylic Polymer Latex AL5

An aqueous acrylic polymer latex AL5 was prepared by a sequential polymerisation process, the resulting polymer component having an overall polymer composition BA/MMA/HEMA/β-CEA=26/38/30/6. It was prepared as follows.

A mixture of 516.2 parts of water and 2.8 parts of Disponil FES993IS is charged to the reactor and heated to 65° C. 5 v/v-% of a pre-emulsified first monomer feed, comprising 116.5 parts of water, 3.4 parts of Disponil FES993IS, 6.7 parts of dodecyl mercaptan, 55.6 parts of n-butyl acrylate, 117.0 parts of methyl methacrylate, 80.9 parts of 2-hydroxyethyl methacrylate and 16.2 parts of β-carboxyethyl acrylate, is charged and the mixture is subsequently heated to 75° C. 30 v/v-% of a premixed initiator feed, comprising 2.0 parts of ammonium persulphate, 132.8 parts of water and 8.5 parts of Disponil FES993IS, is charged to the reactor, which is subsequently heated to 85° C. 5 minutes after the desired temperature has been reached, the addition of the monomer feed and initiator feed is started. The first monomer feed is added over a period of 45 minutes, the initiator feed is added over a period of 105 minutes. Five minutes after the first monomer feed has been added to the reactor the addition of the second monomer feed, comprising 174.8 parts of water, 5.1 parts of Disponil FES993IS, 10.1 parts of dodecyl mercaptan, 120.7 parts of n-butyl acrylate, 138.2 parts of methyl methacrylate, 121.4 parts of 2-hydroxyethyl methacrylate and 24.3 parts of β-carboxyethyl acrylate, is started. The second monomer feed is added over a period of 45 minutes, after which the equipment is rinsed with 87.5 parts of water. After the second monomer feed and the initiator feed have been added to the reactor, the mixture is kept at 85° C. for 30 minutes. 0.36 parts of t-butyl hydroperoxide, 0.36 parts of iso-ascorbic acid and 7.8 parts of water are added and the mixture is kept at 85° C. for another 30 minutes. The resulting aqueous latex (AL5) is cooled and sieved over a 75

μm filter cloth. The overall acid value of the latex polymer component was 23.4 mg KOH/g solid polymer and the overall hydroxyl value was 129.5 mg KOH/g of solid polymer.

Preparation of Acrylic Polymer Latex AL6

An aqueous acrylic polymer latex AL6 was prepared by a sequential polymerisation process, the resulting polymer component having an overall polymer composition BA/MMA/HEMA/β-CEA=28.5/43.5/22/6. It was prepared as follows.

A mixture of 516.2 parts of water and 2.8 parts of Disponil FES993IS is charged to the reactor and heated to 65° C. 5 v/v-% of a pre-emulsified first monomer feed, comprising 116.5 parts of water, 3.4 parts of Disponil FES993IS, 6.7 parts of dodecyl mercaptan, 84.4 parts of n-butyl acrylate, 142.1 parts of methyl methacrylate, 27.0 parts of 2-hydroxyethyl methacrylate and 16.2 parts of β-carboxyethyl acrylate, is charged and the mixture is subsequently heated to 75° C. 30 v/v-% of a premixed initiator feed, comprising 2.0 parts of ammonium persulphate, 132.8 parts of water and 8.5 parts of Disponil FES993IS, is charged to the reactor, which is subsequently heated to 85° C. 5 minutes after the desired temperature has been reached, the addition of the monomer feed and initiator feed is started. The first monomer feed is added over a period of 45 minutes, the initiator feed is added over a period of 105 minutes. Five minutes after the first monomer feed has been added to the reactor the addition of the second monomer feed, comprising 174.8 parts of water, 5.1 parts of Disponil FES993IS, 10.1 parts of dodecyl mercaptan, 107.9 parts of n-butyl acrylate, 151.0 parts of methyl methacrylate, 121.4 parts of 2-hydroxyethyl methacrylate and 24.3 parts of β-carboxyethyl acrylate, is started. The second monomer feed is added over a period of 45 minutes, after which the equipment is rinsed with 87.5 parts of water. After the second monomer feed and the initiator feed have been added to the reactor, the mixture is kept at 85° C. for 30 minutes. 0.36 parts of t-butyl hydroperoxide, 0.36 parts of iso-ascorbic acid and 7.8 parts of water are added and the mixture is kept at 85° C. for another 30 minutes. The resulting aqueous latex (AL6) is cooled and sieved over a 75 μm filter cloth. The overall acid value of the latex polymer component was 23.4 mg KOH/g solid polymer and the overall hydroxyl value was 94.9 mg KOH/g of solid polymer.

Preparation of Acrylic Polymer Latex AL7

An aqueous acrylic polymer latex AL7 was prepared by a sequential polymerisation process, the resulting polymer component having an overall polymer composition BA/MMA/HEMA/β-CEA=28.5/43.5/30/6. It was prepared as follows.

A mixture of 515.1 parts of water and 2.8 parts of Disponil FES993IS is charged to the reactor and heated to 65° C. 5 v/v-% of a pre-emulsified first monomer feed, comprising 115.1 parts of water, 3.4 parts of Disponil FES993IS, 1.4 parts of dodecyl mercaptan, 72.5 parts of n-butyl acrylate, 101.5 parts of methyl methacrylate, 81.5 parts 2-hydroxyethyl methacrylate and 16.3 parts of β-carboxyethyl acrylate, is charged and the mixture is subsequently heated to 75° C. 30 v/v-% of a premixed initiator feed, comprising 2.0 parts of ammonium persulphate, 133.8 parts of water and 8.6 parts of Disponil FES993IS, is charged to the reactor, which is subsequently heated to 85° C. 5 minutes after the desired temperature has been reached, the addition of the monomer feed and initiator feed is started. The first monomer feed is added over a period of 45 minutes, the initiator feed is added over a period of 105 minutes. Five minutes after the first monomer feed has been added to the reactor the addition of the second monomer feed, comprising 176.2 pans of water, 5.1 parts of Disponil FES993IS, 10.2 parts of dodecyl mercaptan, 108.7 parts of n-butyl acrylate, 152.2 parts of methyl methacrylate, 122.3 parts of 2-hydroxyethyl methacrylate and 24.5 parts of β-carboxyethyl acrylate, is started. The second monomer feed is added over a period of 45 minutes, after which the equipment is rinsed with 87.5 parts of water. After the second monomer feed and the initiator feed have been added to the reactor, the mixture is kept at 85° C. for 30 minutes. 0.37 parts of t-butyl hydroperoxide, 0.37 parts of iso-ascorbic acid and 7.8 parts of water are added and the mixture is kept at 85° C. for another 30 minutes. The resulting aqueous latex (AL7) is cooled and sieved over a 75 μm filter cloth. The overall acid value of the latex polymer component was 23.4 mg KOH/g solid polymer and the overall hydroxyl value was 129.5 mg KOH/g of solid polymer.

EXAMPLES 1, C2, 3, 4, 5, 6 and 7

Aqueous compositions corresponding to Examples 1, 3, 4, 5, 6 and 7 (according to the invention) and Example C2 (not according to the invention) were prepared as follows.

EXAMPLE 1

The pH of 100 parts of AL1 was raised to 7 using DMEA (50% in water). The mixture was stirred while 21.7 parts of Bayhydur 3100 was slowly added. Next, the mixture was allowed to stir for 10 minutes. 12.2 parts of water were added for good viscosity during application. After 1 hour, films were cast from the formulated emulsion with wet film thicknesses of 400 μm and 600 μm (wet), respectively, and these films were allowed to dry until tack free at room temperature resulting in dry films with thicknesses of 184 μm and 276 μm respectively. Next, the films were aged at 50° C. for 16 hours and examined for $CO_2$ bubble formation.

EXAMPLE C2

The pH of 100 parts of AL2 was raised to 7 using DMEA (50% in water). The mixture was stirred while 21.7 parts of Bayhydur 3100 was slowly added. Next, the mixture was allowed to stir for 10 minutes. 12.2 parts of water were added for good viscosity during application. After 1 hour films were cast from the formulated emulsion with wet film thicknesses of 400 μm and 600 μm wet, respectively, and these films were allowed to dry until tack free at room temperature resulting in dry films with thicknesses of 184 μm and 276 μm respectively. Next, the films were aged at 50° C. for 16 hours and examined for $CO_2$ bubble formation.

EXAMPLE 3

100 parts of AL3 was stirred while 21.7 parts of Bayhydur 3100 was slowly added. Next, the mixture was allowed to stir for 10 minutes. 12.2 parts of water were added for good viscosity during application. After 1 hour a film was cast from the formulated emulsion with a film thickness of 400 μm (wet), resulting in a dry film with a thickness of 168 μm, the film being allowed to dry until tack free at room temperature. Next, the film was aged at 50° C. for 16 hours and examined for $CO_2$ bubble formation.

EXAMPLE 4

The pH of 100 parts of AL4 was raised to 7 using DMEA (50% in water). The mixture was stirred while 7.5 parts of Bayhydur 3100 was slowly added. Next, the mixture was allowed to stir for 10 minutes. 12.2 parts of water were added for good viscosity during application. After 1 hour films were cast from the formulated emulsion with a film thickness of 400 μm (wet), resulting in a dry film with a thickness of 159 μm, the film being allowed to dry until tack free at room temperature. Next, the film was aged at 50° C. for 16 hours and examined for $CO_2$ bubble formation.

EXAMPLE 5

The pH of 100 parts of AL5 was raised to 7 using DMEA (50% in water). The mixture was stirred while 21.7 parts of Bayhydur 3100 was slowly added. Next, the mixture was allowed to stir for 10 minutes. 12.2 parts of water were added for good viscosity during application. After 1 hour, films were cast from the formulated emulsion with wet film thicknesses of 400 μm and 600 μm (wet), respectively, and these films were allowed to dry until tack free at room temperature resulting in dry films with thicknesses of 184 μm and 276 μm respectively. Next, the films were aged at 50° C. for 16 hours and examined for $CO_2$ bubble formation.

EXAMPLE 6

The pH of 100 parts of AL6 was raised to 7 using DMEA (50% in water). The mixture was stirred while 15.9 parts of Bayhydur 3100 was slowly added. Next, the mixture was allowed to stir for 10 minutes. 12.2 parts of water were added for good viscosity during application. After 1 hour, films were cast from the formulated emulsion with wet film thicknesses of 400 μm and 600 μm (wet), respectively, and these films were allowed to dry until tack free at room temperature resulting in dry films with thicknesses of 175 μm and 262 μm respectively. Next, the films were aged at 50° C. for 16 hours and examined for $CO_2$ bubble formation.

EXAMPLE 7

The pH of 100 parts of AL7 was raised to 7 using DMEA (50% in water). The mixture was stirred while 21.7 parts of Bayhydur 3100 was slowly added. Next, the mixture was allowed to stir for 10 minutes. 12.2 parts of water were added for good viscosity during application. After 1 hour, films were cast from the formulated emulsion with wet film thicknesses of 400 μm and 600 μm (wet), respectively, and these films were allowed to dry until tack free at room temperature resulting in dry films with thicknesses of 184 μm and 276 μm respectively. Next, the films were aged at 50° C. for 16 hours and examined for $CO_2$ bubble formation.

Carbon Dioxide Bubble Rating

The films formed as described above were examined for $CO_2$ bubble formation and rated according to the following procedure:

The dried films were examined visually and rated according to the deformation of the film as a result of $CO_2$ bubble formation. The following rating was used:

5—the film shows no deformation whatsoever
4—very few bubbles formed and the film is almost completely transparent
3—the film is severely deformed and less than half of the area is still transparent
2—the film is strongly deformed with only a few transparent areas remaining
1—the film is completely deformed and has no transparent areas.

The following results were obtained:

| Source of film | Film Thickness | | Rating |
| --- | --- | --- | --- |
| | wet | dry | |
| Example 1 | 400 μm | 184 μm | 5 |
| | 600 μm | 276 μm | 4.5 |
| Example C2 | 400 μm | 184 μm | 2 |
| | 600 μm | 276 μm | 1 |
| Example 3 | 400 μm | 168 μm | 4 |
| Example 4 | 400 μm | 159 μm | 5 |
| Example 5 | 400 μm | 184 μm | 5 |
| | 600 μm | 276 μm | 4.5 |
| Example 6 | 400 μm | 175 μm | 5 |
| | 600 μm | 262 μm | 4.5 |
| Example 7 | 400 μm | 184 μm | 5 |
| | 600 μm | 276 μm | 5 |

The improved quality of the films containing β-CEA (plus higher AA homologues and a small amount of AA itself) instead of solely acrylic acid as the acid monomer is readily apparent.

What is claimed is:

1. Aqueous crosslinkable coating composition comprising:

(A) an aqueous dispersion of at least one vinyl polymer which is hydroxyl- and acid-functional, said aqueous dispersion being a dispersion of said at least one vinyl polymer in a liquid carrier medium at least 50% by weight of which is water, and in which:

(i) said at least one polymer has a hydroxyl value within the range of from 8 to 250 mg KOH/g of solid polymer;

(i) said at least one vinyl polymer has an acid value within the range of from 2 to 55 mg KOH/g of solid polymer, where the contribution of at least 30% of the acid value results from the acid groups of polymerised units in the vinyl polymer of a monocarboxylic acid(s) of formula:

$$CH_2=CR^1-Q-CO_2H \qquad (1)$$

where $R^1$ is H or lower alkyl of 1 to 5 carbon atoms and Q is a non carboxyl-containing spacer group providing a spacer chain of at least 3 atoms, wherein the spacer group Q is of the formula:

$$[-C(=O)-X-(CH_2)_m-]_k \qquad (2)$$

where X is —O— or —NH—, m is at least 1 and k is at least 1; and (B) at least one organic polyisocyanate.

2. Composition according to claim 1 wherein $R^1$ is H or methyl and Q provides a spacer chain of 3 to 20 atoms.

3. Composition according to either claim 1 or claim 2 wherein said acid(s) of formula (1) is or includes β-carboxyethyl acrylate.

4. Composition according to claim 1 or 2 wherein said acid(s) of formula (1) is a mixture of the following acids:

(a) an acid of formula:

$$CH_2=CH-C(=O)-O-CH_2CH_2-CO_2H \qquad (3)$$

and (b) one or more acids of formula:

$$CH_2=CH[C(=O)-O-CH_2CH_2]_qCO_2H \qquad (4)$$

where q is 2 or more.

5. Composition according to claim 4 wherein the proportion of (a) is 25 to 45 weight % and the proportion of (b) acid or acids is 75 to 55 weight %, based on the weight of (a) and (b) acids.

6. Composition according to claim 1 or 2 wherein the contribution from the acid groups of said acid(s) of formula (1) provides at least 40% of the acid value of the polymer.

7. Composition according to claim 1 or 2 wherein the acid value of the at least one vinyl polymer is within the range of from 4 to 35 mg KOH/g of solid polymer.

8. Composition according to claim 1 or 2 wherein the remainder of the acid value, if any, of the at least one vinyl polymer is provided by acid groups from polymerised units of one or both of acrylic acid and methacrylic acid.

9. Composition according to claim 1 or 2 wherein the vinyl polymer(s) of component (A) has a hydroxyl value within the range of from 20 to 175 mg KOH/g of polymer.

10. Composition according to claim 1 or 2 wherein the average hydroxyl functionality of the vinyl polymer(s) of component (A) is ≧2.

11. Composition according to claim 1 wherein said at least one vinyl polymer is an acrylic polymer derived from monomers of which ≧50 weight % have the formula:

(5)

where $R^2$ is H or methyl, $R^3$ is alkyl or hydroxyalkyl, cycloalkyl or hydroxycycloalkyl, or H, and Y is —O— or —NH— with the proviso that any monomers providing hydroxyl or acid functionality are subject to the limitations in the resulting polymer defined in claim 1.

12. Composition according to claim 1 wherein the vinyl polymer(s) of component (A) is formed from the copolymerisation of an olefinically unsaturated acid bearing monomer(s), an olefinically unsaturated hydroxyl bearing monomer(s), and an olefinically unsaturated non-acid, non-hydroxyl-bearing monomer(s), the acid-bearing and hydroxyl-bearing monomers being subject to the limitations in the resulting polymer defined in claim 1.

13. Composition according to claim 1 or 2 wherein said vinyl polymer(s) is derived from a monomer system which comprises 0.5 to 12.5 weight % of a monomer(s) of formula (1); 0 to 3 weight % of an additional carboxylic acid monomer; 2 to 60 weight % of a hydroxyl functional monomer(s); and 27.5–97.5 weight % of a non-acid, non-hydroxyl monomer(s).

14. Composition according to claim 1 or 2 wherein said vinyl polymer(s) is derived from a monomer system which comprises 1 to 6 weight % of an acid monomer(s) of formula (1), 0 to 3 weight % of an additional carboxylic acid monomer(s), 10 to 40 weight % of a hard non-acid, non-hydroxyl acrylic monomer(s), 1 to 79 weight % of a soft non-acid, non-hydroxyl acrylic monomer(s), and 0 to 10 weight % of other vinyl monomer(s), wherein by a hard monomer is meant a monomer which when homopolymerised yields a polymer of Tg>20 C, and by a soft monomer is meant a monomer which when homopolymerised yields a polymer of Tg≦0° C.

15. Composition according to claim 12 wherein said vinyl polymer(s) is derived from a monomer system which comprises 1 to 6 weight % of an acid monomer(s) of formula (1), 0 to 3 weight % of an additional carboxylic acid monomer (s), 5 to 30 weight % of a hydroxyl functional monomer(s), 10 to 50 weight % of a hard styrenic monomer(s) which is one or both of styrene and α-methyl styrene, 10 to 84 weight % of soft non-acid, non-hydroxyl acrylic monomer(s), and 0 to 10 weight % of other vinyl monomer(s), the terms hard monomer and soft monomer being as defined in claim 14.

16. Composition according to claim 1 or 2 wherein said vinyl polymer(s) of component (A) has been made using a sequential polymerisation process.

17. Composition according to claim 16 wherein in said sequential polymerisation a first vinyl polymer phase is prepared in the presence of a second vinyl polymer phase, wherein the polymer weight ratio of the first phase/second phase is 10/90 to 80/20, the Tg of the first phase is ≧65° C. and the Tg of the second phase is ≦45° C.

18. Composition according to claim 16 wherein in said sequential polymerisation a first vinyl polymer phase is prepared in the presence of a second vinyl polymer phase, wherein the polymer weight ratio of the first phase/second phase is 90/10 to 40/60, the Tg of the first phase is ≧45° C. and the Tg of the second phase is ≦65° C.

19. Composition according to claim 1 or 2, said composition has pH within the range 2 to 10.

20. Composition according to claim 1 or 2 wherein said polyisocyanate component (B) is present in component (A) in emulsified form.

21. Composition according to claim 1 or 2 wherein the NCO/OH equivalent ratio, based on the isocyanate groups of component (B) and the hydroxyl groups of component (A), is within the range of from 0.3/1 to 5/1.

22. Method of coating a substrate, which method comprises applying a coating composition according to claim 1 or 2 to a substrate, causing or allowing the aqueous carrier medium of the composition to be removed, and developing crosslinking of the coating that has been applied to the substrate.

23. Crosslinked coating which has been derived from a coating composition according to claim 1 or 2.

24. Coating according to claim 23 wherein said coating has a dry film thickness within the range of from 140 to 300 μm.

25. Coated substrate which has been prepared by applying a coating composition according to claim 1 or 2 to a substrate, causing or allowing the aqueous carrier medium of the composition to be removed, and developing crosslinking of the coating that has been applied to the substrate.

26. A coating composition according to claim 1 or 2 in the form of a paint, lacquer, varnish or ink.

27. The method which comprises coating a member of the group consisting of metals; wood; wood-base materials; cloth; leather; glass; mineral building materials; unfoamed plastics; and plastics foam with a coating composition according to claim 1 or 2.

28. Composition according to claim 1 wherein m is 2 or 3 and k is 1, 2, 3, 4 or 5.

29. Composition according to claim 4 wherein q is 2, 3, 4 or 5.

30. Composition according to claim 6 wherein the acid groups of the acid of formula (1) provides at least 70% of the acid value.

31. Composition according to claim 7 wherein the acid value of the vinyl polymer is 8 to 35 mg KOH/g of solid polymer.

32. Composition according to claim 9 wherein the hydroxyl value is 35 to 140 mg KOH/g of polymer.

33. Composition according to claim 10 wherein the average hydroxyl functionality is ≧2.3.

34. Composition according to claim 13 wherein the monomer system comprises 1 to 10 weight % of β-carboxyethyl acrylate, 0 to 2.5 weight % of at least one acid selected from the group consisting of acrylic acid and methacrylic acid, 6 to 40 weight % of a hydroxyl functional monomer selected from the group consisting of 2-hydroxyethyl acrylate, 2-hydroxyethyl methacrylate, 2-hydroxylpropyl acrylate, 2-hydroxylpropyl methacrylate, 3-hydroxyethyl acrylate, 3-hydroxyethyl methacrylate, 4-hydroxypropyl acrylate and 4-hydroxylpropyl methacrylate; and 35–93 weight % of a non-acid, non-hydroxyl monomer selected from the group consisting of C1–C8 alkyl acrylates, C1–C8 alkyl methacrylates, cycloalkyl acrylates of 5 to 12 ring C atoms, cycloalkyl methacrylates of 5 to 12 ring C atoms, and styrenes.

35. Composition according to claim 14 wherein the hard, non-acid, non-hydroxyl acrylic monomer is at least one member of the group consisting of methyl methacrylate, isobornyl methacrylate and cyclohexyl acrylate and the soft non-acid, non-hydroxyl acrylic monomer is at least one member of the group consisting of n-butyl acrylate, 2-ethylhexyl acrylate and ethyl acrylate.

36. Composition according to claim 15 wherein the soft non-acid, non-hydroxyl acrylic monomer is at least one member of the group consisting of n-butyl acrylate, 2-ethylhexyl acrylate and ethyl acrylate.

* * * * *